(12) United States Patent
Linden et al.

(10) Patent No.: US 6,786,291 B1
(45) Date of Patent: Sep. 7, 2004

(54) MOTOR VEHICLE WITH A FRONT-MOUNTED ENGINE AND AIR GUIDE CHASSIS

(75) Inventors: Michael Linden, Sodertalje (SE); Fredrik Modahl, Norsborg (SE); Ola Logdberg, Stockholm (SE)

(73) Assignee: Scania CV AB (Publ) (SE)

( * ) Notice: Subject to any disclaimer, the term of this patent is extended or adjusted under 35 U.S.C. 154(b) by 49 days.

(21) Appl. No.: 10/089,638

(22) PCT Filed: Sep. 25, 2000

(86) PCT No.: PCT/SE00/01849
§ 371 (c)(1),
(2), (4) Date: Mar. 29, 2002

(87) PCT Pub. No.: WO01/23246
PCT Pub. Date: Apr. 5, 2001

(30) Foreign Application Priority Data

Sep. 29, 1999 (SE) .............................................. 9903518

(51) Int. Cl.[7] .............................................. B60K 11/00
(52) U.S. Cl. ................... 180/68.2; 180/229; 123/41.56; 296/180.1
(58) Field of Search .............................. 180/68.2, 68.1, 180/229; 123/41, 56, 41.64, 4.65, 41.65; 296/180.1

(56) References Cited

U.S. PATENT DOCUMENTS

| | | | | |
|---|---|---|---|---|
| 1,816,161 A | * | 7/1931 | Strauss | 123/41.64 |
| 4,325,451 A | * | 4/1982 | Umeda | 180/294 |
| 4,830,135 A | * | 5/1989 | Yamashita | 180/229 |
| 4,976,327 A | * | 12/1990 | Abujudom et al. | 180/68.2 |
| 5,322,340 A | * | 6/1994 | Sato et al. | 296/180.1 |
| 5,813,491 A | * | 9/1998 | Sato et al. | 180/309 |
| 5,975,227 A | * | 11/1999 | Vlad | 180/65.4 |

FOREIGN PATENT DOCUMENTS

| | | | | |
|---|---|---|---|---|
| DE | 423116 | | 12/1925 | |
| DK | WO 9414628 A | * | 7/1994 | B60K/1/00 |
| JP | 08040087 A | * | 2/1996 | B60K/11/04 |
| SE | 462426 | | 6/1990 | |

* cited by examiner

Primary Examiner—Brian L. Johnson
Assistant Examiner—Kelly E Campbell
(74) Attorney, Agent, or Firm—Ostrolenk, Faber, Gerb & Soffen, LLP

(57) ABSTRACT

A motor vehicle with a forward-mounted engine and a forward-situated air intake has a tubular chassis element running in the longitudinal direction of the vehicle. Between the air intake and the chassis element there is a guide arrangement for leading air into and through the chassis element past at least one major vehicle component, advantageously the vehicle's gearbox, situated inside the chassis element. Downstream from that major vehicle component there is an air outlet.

20 Claims, 1 Drawing Sheet

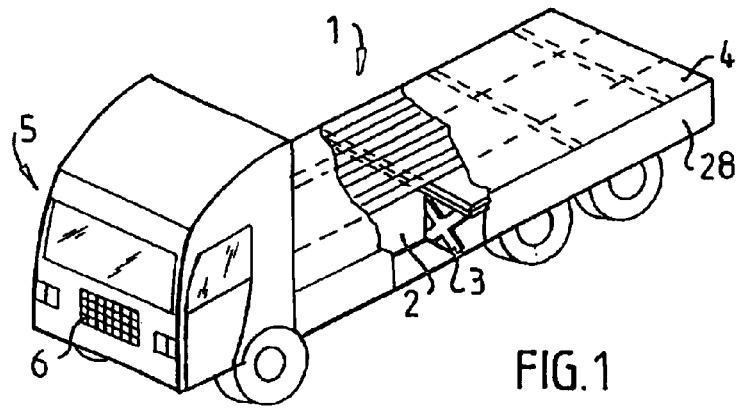
FIG. 1
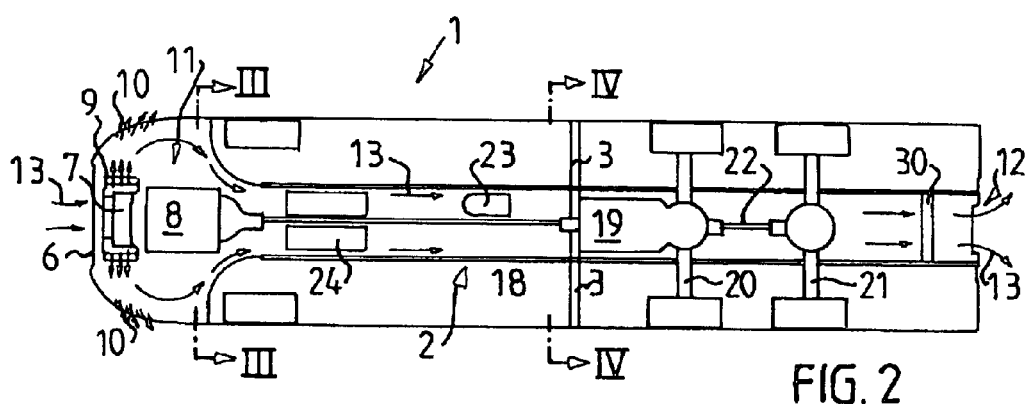
FIG. 2
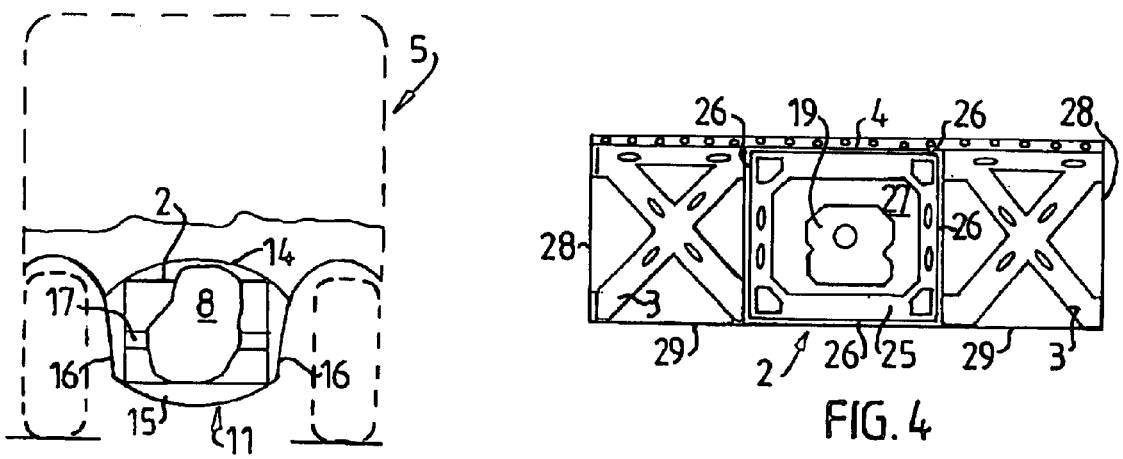
FIG. 3
FIG. 4

MOTOR VEHICLE WITH A FRONT-MOUNTED ENGINE AND AIR GUIDE CHASSIS

TECHNICAL FIELD

The invention relates to a motor vehicle with a forward-mounted engine, and a tubular chassis element for guiding air flow.

STATE OF THE ART

In trucks it is usual for the engine, clutch, gearbox and other components to be situated far forward, under a driver's cab, which is often tiltable forwards to provide access. These components and the drivers cab usually have extending to the rear of them an open vehicle fame which consists of C-beams, supports rear axles and has on top of it some form of load carrier which extends sideways beyond the vehicle frame.

Such a type of vehicle frame is relatively weak fexurally and torsionally and causes limitations with regard to good running characteristics in cases where a rigid vehicle frame is desired. This type of vehicle superstructure, with an engine space which is usually open downwards, and with components situated at various points forward on the vehicle, entails relatively large flow resistance which has unfavourable effects on operational economics.

In the light of endeavours to improve the running characteristics and operational economics of vehicles, arrangements of these known kinds therefore seem less advantageous.

OBJECT OF THE INVENTION

The invention aims to provide an improved vehicle design which does not have the aforesaid disadvantages.

DESCRIPTION OF THE INVENTION

This object is achieved according to the invention by a motor vehicle with an air guiding, tubular shape chassis element extending from an air inlet at the front to an air outlet at the rear, a guide arrangement around the engine for guiding air entering the air intake of the vehicle past the engine and into and though the chassis element. A vehicle component in the tubular chassis element is affected by the air flow.

Providing motor vehicles with a tubular chassis element which can easily be made resistant to torsion and bending makes it possible for components forming part of the vehicle's driveline to be provided with good protection by being situated inside this chassis element. Further designing the vehicle so that air is led through this chassis element by means of a guide arrangement provides components within the chassis element with necessary cooling and makes it possible for the vehicle to be provided, by means of the guide arrangement and the chassis element, with a smoother underside and hence reduced flow resistance while in motion.

Further advantages and fetes of the invention arm indicated in the ensuing description and patent claims.

DESCRIPTION OF DRAWING

The invention is explained in more detail below on the basis of an embodiment depicted in the attached drawing, in which:

FIG. 1 is a perspective view, partly in section, of a motor vehicle according to the invention, FIG. 2 is a schematic horizontal section through the vehicle in FIG. 1, FIG. 3 is a section III—III in FIG. 2, and FIG. 4 is a section IV—IV in FIG. 2.

DESCRIPTION OF A PREFERRED EMBODIMENT

A motor vehicle 1 of the truck type depicted in FIG. 1 has, running in its longitudinal direction, a tubular chassis element 2 which is provided on each side with a number of support devices 3 which are distributed along the chassis element 2 and protrude sideways. The chassis element 2 and the support devices 3 have resting on then a load platform 4 which may possibly be provided with some form of superstructure. In front of the load platform 4 there is a driver's cab 5 which has at its front an air intake 6 which may possibly have a number of apertures in the vehicle's front.

As indicated in more detail in FIG. 2, them is behind the air intake 6 a fan 7, advantageously of radial type, which propels air radially towards a radiator 9 which belongs to the vehicle's engine 8, is arranged round the fan 7 and may advantageously be divided into a number of individual radiator elements. The fan 7 and the radiator 9 are dimensioned to provide good cooling of the engine 8 in a variety of opting situations. Part of the air drawn in is discharged, after passing the radiator 9, via air vents 10, e.g. one on each side of the vehicle. The remainder of the air drawn in is led partly as combustion air to the engine 8 and partly via a guide arrangement 11 past the engine 8 into the inside of the tubular chassis element 2 before finally leaving the chassis element 2 via an air outlet 12 at the latter's rear end. The air flow is represented by arrows 13.

The guide arrangement 11 round the motor 8 includes (see FIG. 3) a lower portion 14 in the driver's cab 5, a bottom plate 1 arranged under the engine and a section 16 of the front wheel housing. These various parts are jointly designed so that air is led round the engine and rearwards to the chassis element 2. The bottom plate 15 is also intended to reduce air resistance by providing the front portion of the vehicle with a smooth underside. The engine 8 rests on beams 17 which are fastened in the forward end of the chassis element 2.

FIG. 2 also shows that from the engine 8 a forward driveshaft 18 runs inside the chassis element 2 to a gearbox 19 which is accommodated likewise inside the chassis element 2 and is situated immediately forward of, and is connected to, a first rear axle 20. A second rear axle 21 is driven from the gearbox 19 via a rear driveshaft 22. The air which flows through the chassis element 2 cools the gearbox 19 and also other components situated in the chassis element 2, e.g. a compressor 23 for the vehicle's brake system and components for the vehicle's air conditioning system The two rear axles 20 and 21 are supported movably in the chassis element 2 via suspension parts not further detailed here.

The construction of the chassis element 2 executed in the form of a shell structure is indicated in more detail in FIG. 4. At mutual spacings along the chassis element 2 there are a number of rectangular ribs 25 which have panels 26 fastened round their sides so as to form a tubular space 27. At at least some of the ribs 25, support devices 3 are fastened on both sides and have side panels 28 and bottom panels 29 fastened to them. The underside panels 26 and 29 provide the vehicle with a smooth underside, and the aide panels 28 and bottom panels 29 create enclosed spaces for various components on both sides of the chassis element 2. Advantageously, at least some of the panels, or parts of them, are detachable to provide access to components in or alongside the chassis element 2.

The air outlet 12 at the rear of the chassis element 2 may take the form of apertures in an endplate on the chassis element 2. It is possible for the chassis element 2 to contain a fan 30 to influence the air flow. One possibility is for this fan to be situated at the air outlet 12. The ribs 25 forming part of the chassis element 2, and the panels 26, are dimensioned so as to create a structure resistant to bending and torsion. This combined with advantageously designed wheel suspensions makes improved vehicle running characteristics possible. The protected space within the rigid chassis element 2 makes it possible for the gearbox to be situated close to the vehicle's powered wheels, resulting in good weight distribution, while at the same time the transmission path for large torques from the gearbox will be short and the gearbox will be in a well-protected location The air which flows through the chassis element 2 is normally intended for cooling various components inside the chassis element, but it is of course possible, e.g. for operation in severe cold, to lead warmer air rearwards and thereby reduce the cooling. This may be achieved, for example, by using advantageously designed air flow switching devices to cause a g proportion of the air passing the radiator 9 to pass through the chassis element 2.

The design of the guide arrangement 11 for the air flow rearwards round the engine 8 depends on the design of the forward portion of the vehicle and may therefore be designed otherwise than as described here.

What is claimed is:

1. A motor vehicle including an engine and an air intake, both located toward the front of the vehicle:
   a tubular chassis element extending longitudinally from the front part toward the rear of the vehicle, the chassis element having a substantially constant external cross-section along the length thereof;
   the chassis element including an air inlet located at the front and an air outlet located at the rear;
   a guide arrangement disposed in the vehicle and shaped to lead air flow from the air intake into the air inlet of the chassis element;
   the engine is disposed forward of the chassis element, and the guide arrangement is connected forwardly to the air intake and rearwardly to the chassis element; and
   at least one vehicle component disposed inside the chassis element positioned so air moving through the chassis element to the air outlet passes the component.

2. The vehicle of claim 1, wherein the guide arrangement is shaped to surround the engine.

3. The vehicle of claim 2, wherein the guide arrangement includes a bottom plate disposed under the engine.

4. The vehicle of claim 3, further including a driver's cab, a lower portion of the driver's cab comprising part of the guide arrangement.

5. The motor vehicle of claim 1, further comprising a fan arrangement inside the chassis element and operable to assist air flow through the chassis element toward the outlet.

6. The vehicle of claim 5, wherein the fan arrangement is located toward the rear of the chassis element and toward the air outlet.

7. The vehicle of claim 1, further comprising a plate at the rear of the chassis element which provides the air outlet for the chassis element.

8. The vehicle of claim 1, wherein a component of the vehicle drive line is located inside the chassis element.

9. The vehicle of claim 1, further comprising:
   a radiator for the engine located at the engine;
   air vents disposed in the path of air from the air intake and located past the radiator, the air vents being shaped and positioned to discharge part of the air drawn into the air intake and to reduce the air supplied to the guide arrangement.

10. A motor vehicle including an engine and an air intake, both located toward the front of the vehicle:
    a tubular chassis element extending longitudinally from the front part toward the rear of the vehicle, the chassis element having a substantially constant external cross-section alone the length thereof;
    the chassis element including an air inlet located at the front and an air outlet located at the rear;
    a guide arrangement disposed in the vehicle and shaped to lead air flow from the air intake into the air inlet of the chassis element; and
    at least one vehicle component disposed inside the chassis element positioned so air moving through the chassis element to the air outlet passes the component, wherein the vehicle component inside the chassis element is a gear box of the vehicle.

11. A motor vehicle including:
    an engine and an air intake, both located toward the front of the vehicle;
    a tubular chassis element extending longitudinally from the front of the vehicle toward the rear, the chassis element defining an air passage having a substantially constant internal cross-section along the length thereof and including an air inlet located at the front and an air outlet located at the rear;
    a guide arrangement disposed in the vehicle and shaped to lead air flow from the air intake into the air inlet of the chassis element;
    the engine is disposed forward of the chassis element, and the guide arrangement is connected forwardly to the air intake and rearwardly to the chassis element; and
    at least one vehicle component disposed inside the chassis element positioned so air moving through the chassis element to the air outlet passes the component.

12. The vehicle of claim 11, wherein the guide arrangement is shaped to surround the engine.

13. The vehicle of claim 12, wherein the guide arrangement includes a bottom plate disposed under the engine.

14. The vehicle of claim 13, further including a driver's cab, a comprising part of the guide arrangement.

15. The motor vehicle of claim 11, further comprising a fan arrangement inside the chassis element and operable to assist air flow through the chassis element toward the outlet.

16. The vehicle of claim 15, wherein the fan arrangement is located element toward the rear of the chassis element and toward the air outlet.

17. The vehicle of claim 11, further comprising a plate at the rear of the chassis element which provides the air outlet for the chassis element.

18. The vehicle of claim 11, wherein a component of the vehicle drive line is located inside the chassis element.

19. The vehicle of claim 11, further comprising:
    a radiator for the engine located at the engine;
    air vents disposed in the path of air from the air intake and located past the radiator, the air vents being shaped and positioned to discharge part of the air drawn into the air intake and to reduce the air supplied to the guide arrangement.

20. A motor vehicle including:
    an engine and an air intake, both located toward the front of the vehicle;
    a tubular chassis element extending longitudinally from the front of the vehicle toward the rear, the chassis element defining an air passage having a substantially constant internal cross-section along the length thereof and including an air inlet located at the front and an air outlet located at the rear;

a guide arrangement disposed in the vehicle and shaped to lead air flow from the air intake into the air inlet of the chassis element; and at least one vehicle component disposed inside the chassis element positioned so air moving through the chassis element to the air outlet passes the component, wherein the vehicle component inside the chassis element is a gear box of the vehicle.

* * * * *